April 28, 1964     C. V. STOLLSTEIMER     3,130,444
AUXILIARY HANDLE FOR POWER LAWN MOWERS
Filed May 10, 1962                         2 Sheets-Sheet 1
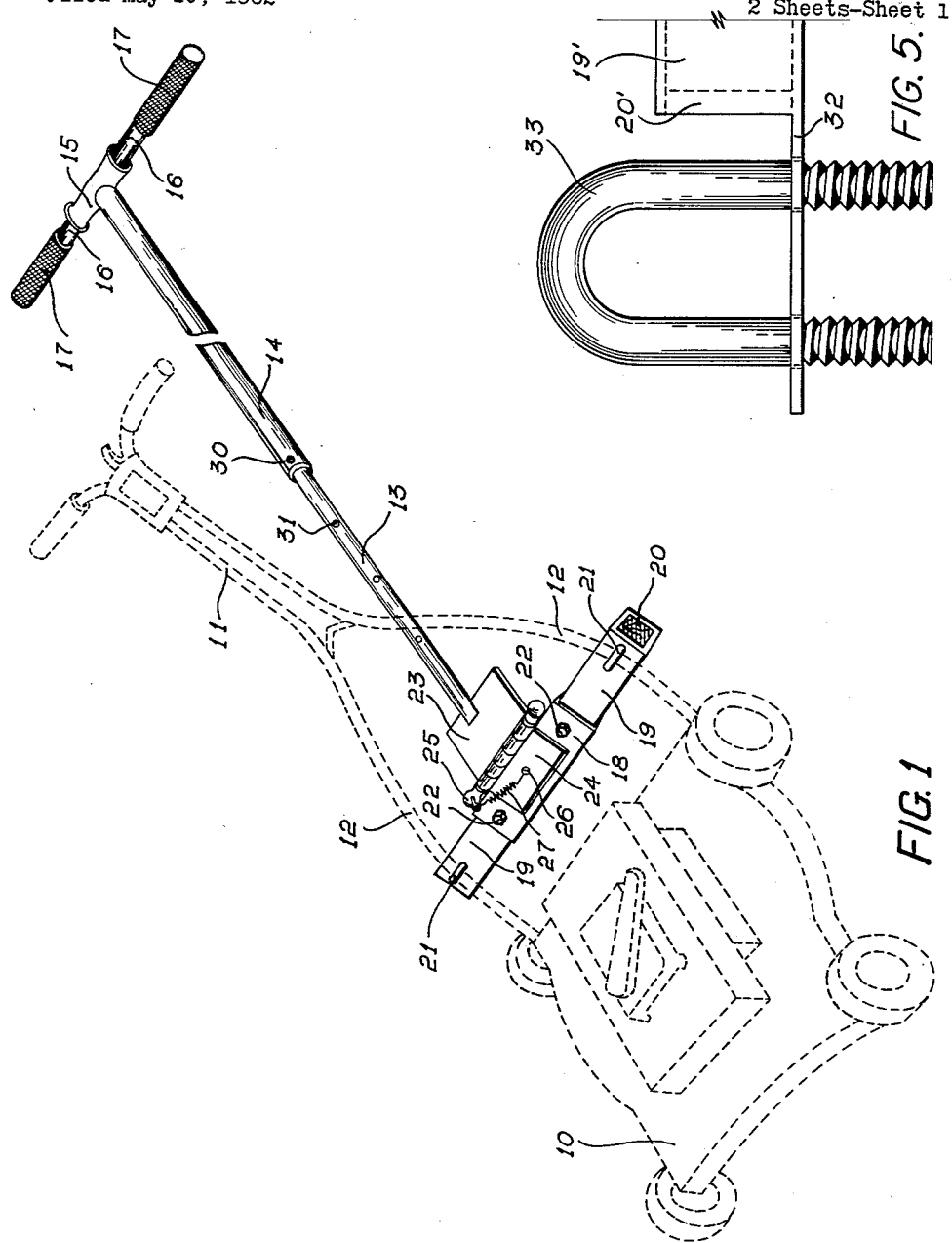
INVENTOR
CHARLES V. STOLLSTEIMER
BY Larson and Taylor
ATTORNEY April 28, 1964 C. V. STOLLSTEIMER 3,130,444
AUXILIARY HANDLE FOR POWER LAWN MOWERS
Filed May 10, 1962 2 Sheets-Sheet 2
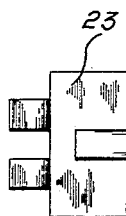
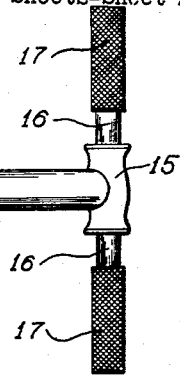
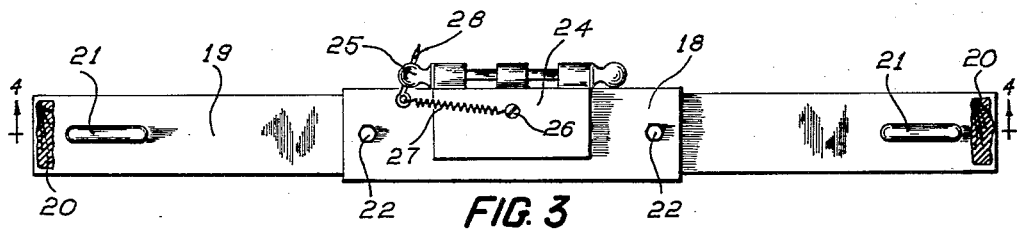
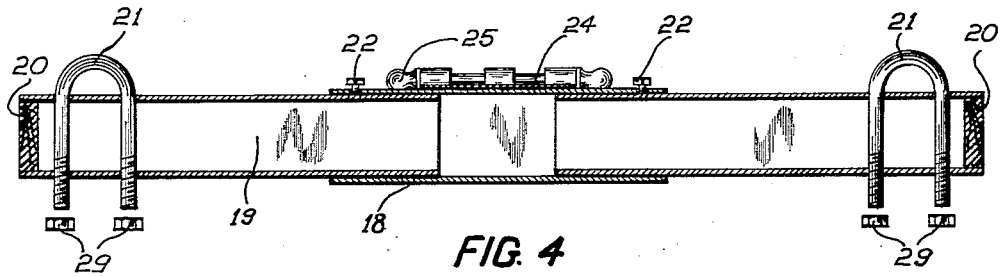
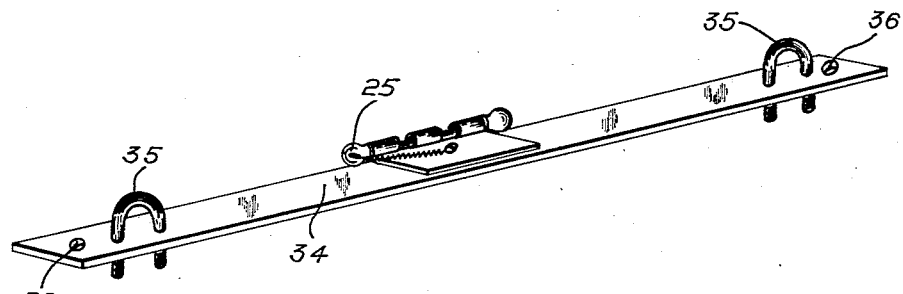
INVENTOR
CHARLES V. STOLLSTEIMER
BY Larson and Taylor
ATTORNEY

United States Patent Office 3,130,444
Patented Apr. 28, 1964

3,130,444
AUXILIARY HANDLE FOR POWER LAWN MOWERS
Charles V. Stollsteimer, 1137 Rosemount Road, Portsmouth, Ohio
Filed May 10, 1962, Ser. No. 193,794
4 Claims. (Cl. 16—110)

This invention relates to an auxiliary handle for use with power lawn mowers, and more particularly an extensible and detachable handle without requiring modification of the existing structure of the mower while still utilizing the mower at its maximum capability.

Heretofore, auxiliary handles for lawn mowers have been of two types. One type comprises a substitute for the original handle, i.e., removal of the original handle, and substituting a longer and/or telescoping handle. The second type used for mowing downwardly on slopes comprises a handle attached directly and rigidly to the original mower handle at an angle thereto. There may also have been means for adjusting this angle according to the angle of the slope to be mowed.

However, I have discovered that both of these known types of handles have disadvantages and are generally unsuitable for prolonged use with power mowers, as for example vibration due to improper motor or blade setting. My invention was more particularly developed for use with power mowers, thereby reducing the vibration effect and possible foot injuries, while still increasing the adaptability of the mower. This is accomplished more particularly by the use of a second free hinge point on the auxiliary handle. The operator still remains in complete control of the mower.

An important object of this invention, therefore, resides in the provision of an auxiliary handle particularly adaptable for use with power lawn mowers.

Another object resides in the provision of an auxiliary handle attachable to the existing handle of a mower and containing a distinct and separate hinge point independent of the hinge of the existing handle.

Still another object resides in an auxiliary handle which may be removed for easy storage, and the use of which requires no modification of the power mower and no need for tools after initial hookup.

Yet other objects and advantages will become more apparent during the course of the following detailed description of the invention.

In reference to the accompanying drawings wherein like numerals designate like parts throughout:

FIG. 1 is a perspective view showing the handle as attached to a power lawn mower.

FIG. 2 is a top view of the handle portion.

FIG. 3 is a top view of the mounting bracket.

FIG. 4 is a section view taken on line 4—4 of FIG. 3.

FIG. 5 is a detail of one modification of the attaching means of the bracket.

FIG. 6 is a perspective of a modified embodiment of the mounting bracket.

As schematically shown in FIG. 1, a typical power lawn mower may comprise a body portion 10 having therein a gasoline driven motor for continuously rotating a cutter blade in a horizontal plane. The handle 11 of the mower may usually contain bifurcated connecting sections 12, each of which is freely and pivotably attached at or near the rear wheel shaft of the mower. An important limitation in most mowers of this type is that the handle 11 acts well behind the center of gravity of the body 10, and the body portion 10 may contain stops for limiting the angle of the handle to a particular range of degrees above the horizontal.

The auxiliary handle portion according to the invention may comprise two telescoping sections 13, 14 of metal tubing, for example, steel or aluminum. Section 13 is of a smaller tubing than section 14, so that it may be slidable within section 14. Pipe T 15 is fitted on the outer end of section 14, and handle portions 17 are attached thereto. Handle portions 17 may be fixedly or rotatably mounted on the T 15. Rubber grips 17 may also be provided.

The mounting bracket, in its preferred embodiment, includes a central bracket member 18 of square or rectangular cross-section and open ends. Slidably mounted within the ends of bracket member 18 are two attaching members 19 of similar but cross-sectionally smaller tubing. In the outer end opening of each member 19, solid plugs 20 are fitted snugly. Plug 20 may be either of hard wood or metal and used primarily to prevent distortion of the mounting bracket. U-bolts 21 attach the bracket to the handle section 12. Each U-bolt 21 passes around a section 12 and through two corresponding pairs of aligned holes in the member 19. The U-bolts 21, and thereby members 19, are held to handle sections 12 by means of nuts 29 threaded on the open ends of the U-bolts. Appropriate set screws 22 are provided for holding members 19 in the selected location for the desired length.

A hinge portion 24 is attached to the top surface of the bracket member 18. Cooperating hinge portion 23 is fixed to the lower end of handle portion 13. Hinge portions 23, 24 pivot freely relatively to each other about a common hinge pin 25, forming the axis of rotation. Pin 25 lies in a horizontal position parallel to bracket members 18, 19 and is perpendicular to the handle portions 13, 14. Hinge pin 25 is preferably removable for enabling dismounting of the handle portion. During use, however, hinge pin 25 is securely held in place by a releasing pin 28, engaging a corresponding hole in the outer end of the hinge pin 25. A tension spring 27, fixed at one end to hinge portion by screw 26 as shown, and at the other end to pin 28, urges the releasing pin 28 and thereby pin 25, inwardly toward the center of the hinge. This prevents any accidental separation.

Generally, the mounting bracket is first attached by placing it in the appropriate place against the handle sections 12 so that hinge portion 24 lies substantially in the same plane as the bifurcated sections 12. As shown in FIG. 1, the hinge portion 24 is on the top surface, and the bracket is below the section 12. The U-bolts 21 are then fitted over the section 12, through the cooperating holes in members 19, and then tightened. Set screws 22 are then tightened to centrally locate member 18.

If the handle portion is to be extensible, as shown in FIG. 3, lower section 13 is provided with a series of spaced threaded holes 31. A set screw 31, located in another threaded hole in section 14 may then be screwed into the selected hole 31 to rigidly position the handle sections 13 and 14 for the desired length.

If the associated lawn mower has larger diameter handle sections 12, the modification as shown in FIG. 5 is preferred. Here the attaching member is shown by 19', wherein the end portion is cut so that the lower side extends beyond the remaining sides, thereby forming a flange 32 having a pair of holes, through which a larger U-bolt 33 is passed. In this manner, it can be seen that the hinge pin will still lie substantially in the same plane as the mower handle.

A second embodiment, shown in FIG. 6, shows a single plate bracket 34, the ends of which may have a series of spaced holes 36. U-bolts 35 may then be selectively placed in the proper holes. It can again be seen that the hinge point lies in substantially the same plane as the mower handle.

A useful handle strength, at full extension, may be about 8 feet, exclusive of overlap between sections 13 and 14.

For use with a mower having a 20 inch diameter blade, the mounting bracket is preferably attached about 9 inches above the pivot points of the handle 11. In this manner, the auxiliary handle, when in use, acts on the mower in a small range directly about the center of gravity of the mower. As can be seen from FIG. 1, the force projection of the auxiliary handle, from along its length, is directed toward the mower center. This is only possible because the hinge 23—25 permits entirely free movement in the vertical plane; the use of two distinct hinge points transfers the force to the center without subsantial movement of the pivot arms. Variations about the center of gravity are used to advantage when the mower diverts from the horizontal.

Other advantages are also apparent. The operator is in complete lateral control of the mower, since there is only rotation in the vertical plane about a hinge pin of substantial length, and the handle portion may be readily detached for storage without removing the bracket. A remote control unit might also be attached to the handle portions 16, 17 by suitable clamps and control cables leading from the control levers on the mower.

Attaching the handle by hinge means further absorbs vibration due to an unbalanced blade or adjustment of motor, thereby eliminating unnecessary damage to the mower housing, or constant checking and tightening of fixtures.

It is to be understood, however, that the particular form of the invention shown in the preferred example, and that various changes in the shape, size and arrangement of parts may be resorted to without departing from the spirit of the invention, or the scope of the subjoined claims.

I claim:

1. An auxiliary handle for attachment to a freely pivotable handle of a power lawn mower comprising a horizontal mounting bracket including adjustable means for rigidly attaching the bracket to a mower handle; a first hinge part rigidly fixed to said bracket centrally thereof; a second hinge part rigidly fixed to one end of the handle part; an elongated handle part; and a hinge pin having its central axis in the horizontal plane joining the two said hinge parts for free pivoting of the handle part during use, the bracket comprising a hollow rectangular center member, two rectangular end members, each slideable in an end of the center member, each further defining at least two aligned holes, means for fixing the positions of the end members relative to the center member, plug means fitting in the outer ends of the end members and bolt means cooperating with said holes.

2. The handle according to claim 1, wherein each of the end members includes a flange extending from one surface thereof, the flanges defining said holes.

3. The handle according to claim 1 and comprising U-bolts at the outer ends of the end members and passing through the aligned holes, the mower handle being positioned between the inside of the U-bolts and the end members.

4. The handle according to claim 2 and comprising a U-bolt pasing through the holes of each flange, the mower handle being bifurcated with each section thereof being positioned between a U-bolt and the respective flange.

References Cited in the file of this patent

UNITED STATES PATENTS

| | | |
|---|---|---|
| 1,368,503 | Kallauner | Feb. 15, 1921 |
| 1,754,407 | Stearman | Apr. 15, 1930 |
| 2,602,953 | Dalglish et al. | July 15, 1952 |
| 2,716,559 | Boyce | Aug. 30, 1955 |
| 2,757,013 | Brier | July 31, 1956 |
| 3,008,176 | Paine et al. | Nov. 14, 1961 |